Aug. 29, 1950     C. C. MILLER, JR     2,520,887
FORWARD ROTOR TRANSMISSION FOR HELICOPTERS

Filed July 6, 1948     3 Sheets—Sheet 1

INVENTOR

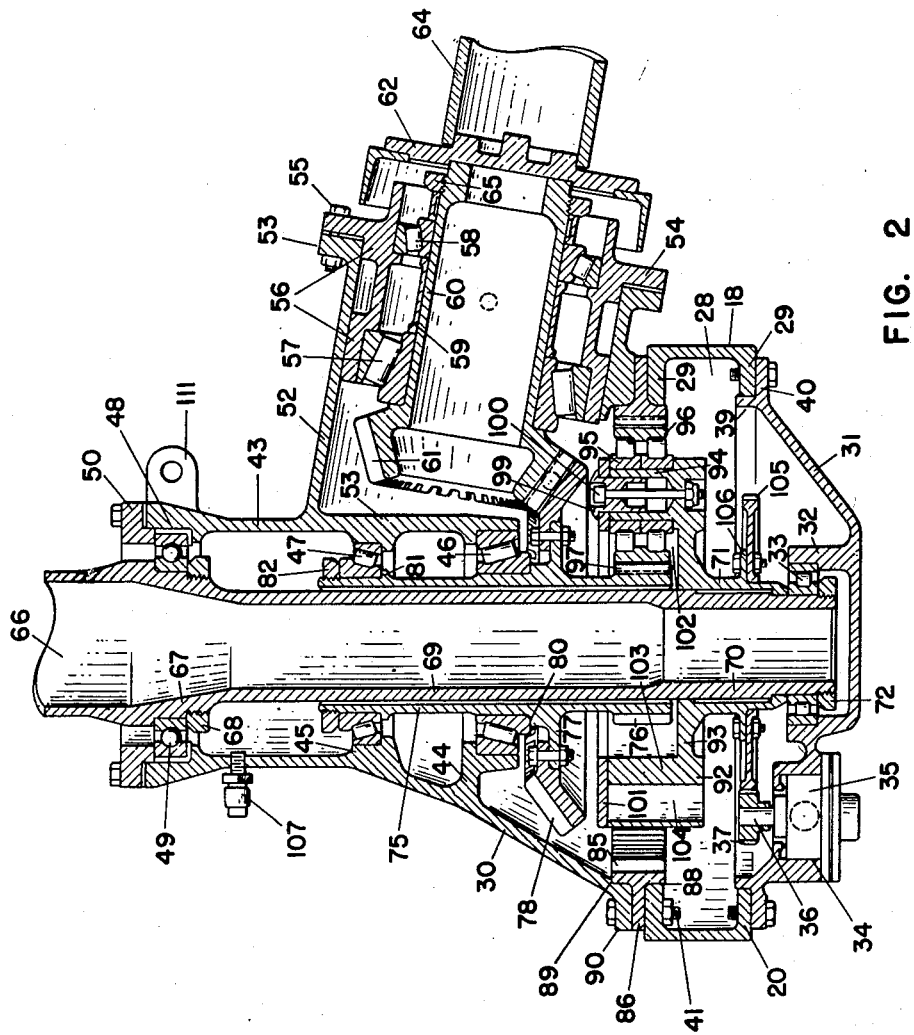

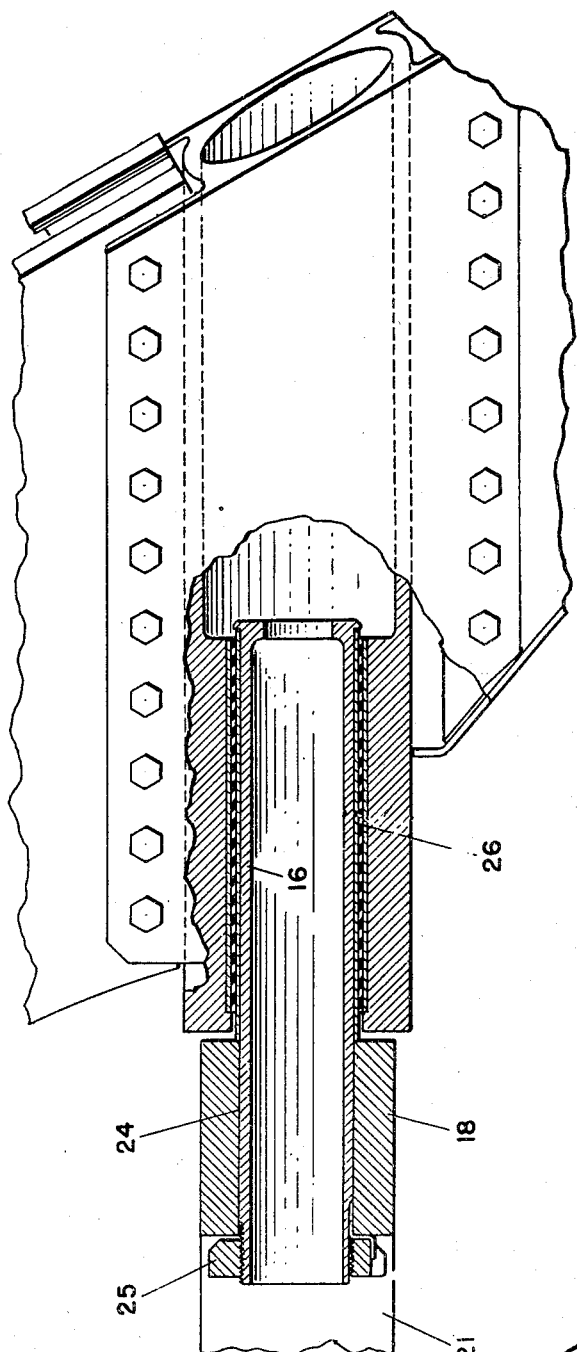

Patented Aug. 29, 1950

2,520,887

UNITED STATES PATENT OFFICE 2,520,887

FORWARD ROTOR TRANSMISSION FOR HELICOPTERS

Charles C. Miller, Jr., Springfield, Pa., assignor to Piasecki Helicopter Corporation, Morton, Pa.

Application July 6, 1948, Serial No. 37,287

11 Claims. (Cl. 74—801)

This invention relates to power transmissions, and more particularly to such transmissions for use between the vertical rotor drive shaft of a helicopter and the downwardly inclined power drive shaft therefor.

It is a general object of the present invention to provide a novel and improved transmission for the purpose described.

More particularly it is an object of the invention to provide a transmission arranged between a substantially vertical rotor shaft and a downwardly inclined power shaft which incorporates an epicyclic gear reduction mechanism mounted in a combined housing and transmission support of extreme lightness and compactness which provides adequate journalling for the various components transmitting the power which takes and transfers the various thrusts, torques and couples resulting from the actions of and on the rotor.

One of the important objects of the invention consists in the provision of a combined housing-support for a transmission device for helicopters which comprises a diamond-shaped hollow unit arranged to mount, on its major axis, two of the three supporting pins for the transmission, said housing-support being provided with upper and lower attached bells which respectively carry the upper and lower bearings for the main rotor shaft.

Another important object of the invention consists in the provision of a transmission for the forward rotor of a tandem rotor type helicopter in which the transmission housing is provided with three transversely disposed parallel supporting pins, two in the horizontal plane of the main gear reduction assembly therein and the third elevated above and rearwardly disposed thereto, and in which the principal drive and partial gear reduction between the power shaft and the rotor shaft is arranged in a plane vertically intermediate that of the first and third sets of pins.

An important feature of the invention comprises the arrangement of an orbit gear between the flanges of the main housing and those of one of the bell sections, together with the use of a planet carrier secured near the lower end of the rotor shaft and having planets meshing with said orbit gear.

Another feature of the invention of importance resides in the use of an integral lateral sleeve projecting from the upper housing bell in which is fitted a combined closure cap and dual bearing mount for the drive pinion stub shaft.

Other and further objects and features of the present invention will be more apparent to those skilled in the art to which this invention pertains upon a consideration of the accompanying drawings and the following specification, wherein is disclosed a single exemplary embodiment, with the understanding that such changes and modifications may be made therein as fall within the scope of the appended claims without departing from the spirit of the invention.

In said drawings:

Fig. 2 is a fore and aft vertical section through the transmission housing and its shaft attachments; and Fig. 3 is a fragmentary vertical section transverse to the axis of the helicopter, taken on line 3—3 of Fig. 1 showing the attachment of the two ends of one of the principal mounting pins.

Figure 1:
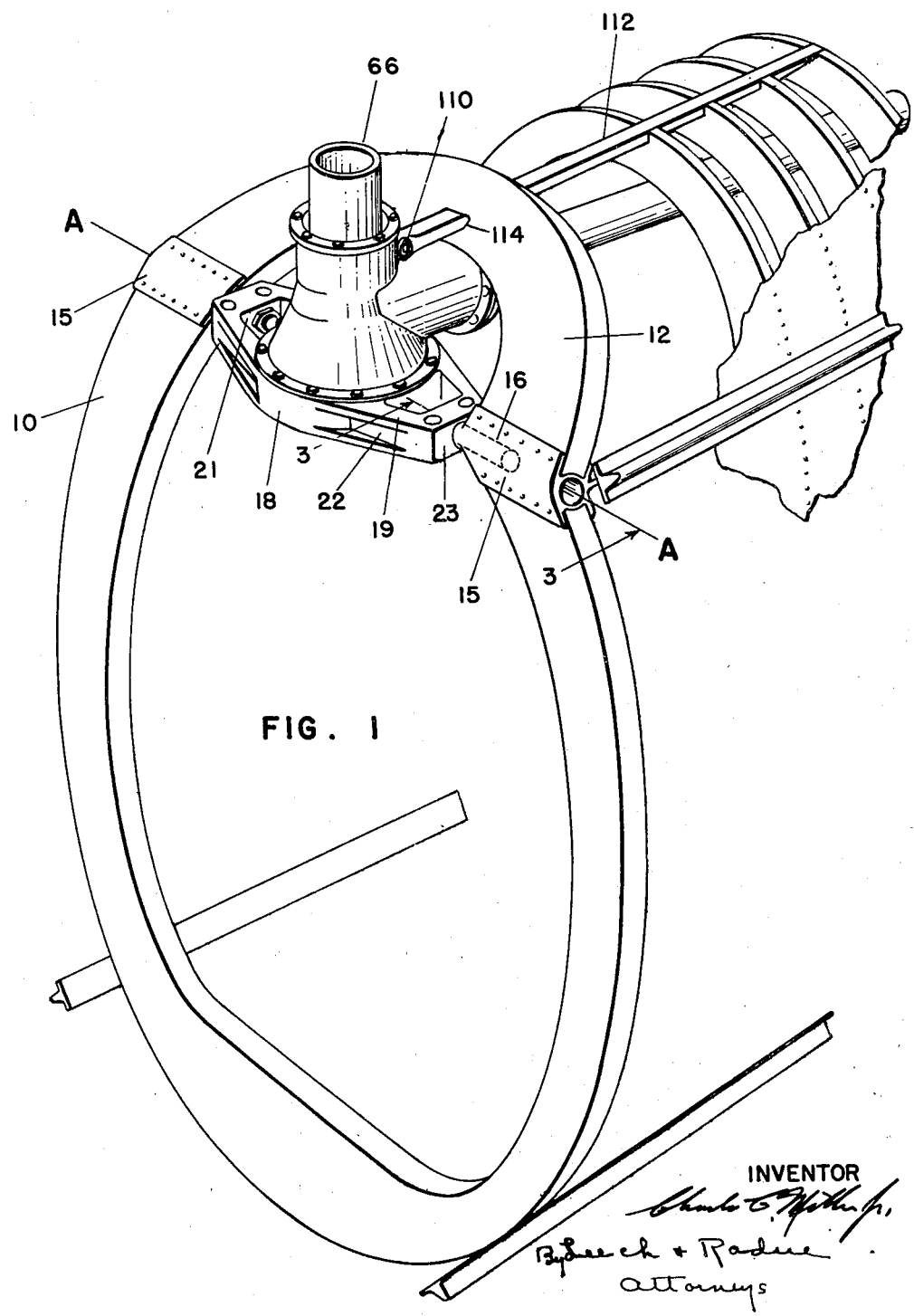
Fig. 1 is a perspective view of the principal bulkhead of the forward pylon and fuselage of a tandem rotor helicopter together with the transmission housing-support assembly depicting stubs of the vertical rotor shaft and of the downwardly inclined drive shaft extending from the rear of the transmission and illustrating the three pin mounting of the transmission from the fuselage.

Helicopters, whether they be of the single or tandem rotor types are usually so constructed that for balance and/or space disposition reasons the engine cannot be located on the axis of the rotor. Furthermore, conventional aviation engines are approved and most readily available for this usage and their best operating speed is of the order of 2,000 revolutions per minute, whereas the combined lifting and propulsion rotor for the helicopter operates best at speeds of the order of three or four hundred revolutions per minute, dependent to some extent on the rotor diameter, since it is desirable to maintain the rotor blade tip speeds in the subsonic range.

The above combination of circumstances requires a light-weight transmission which not only is capable of handling the considerable power necessary for the operation of the helicopter but which must transfer the power from an inclined drive shaft to the vertical rotor shaft and at the same time reduce the drive speed at a ratio of the order of 6 to 1. Moreover, the transmission assembly provides the only rotational and thrust bearings for the rotor shaft and must be sufficiently strong to resist a multitude of thrusts, torques and couples acting in various directions. It must be able to support and transmit the lift of the air screw or rotor to the fuselage and resist thrust both laterally and longitudinally as well as yawing movement and rotational counter-torque. These multiple duties require a highly developed mechanism because of the immediate requirements for minimum weight, long life and cost within reason.

The transmission assembly illustrated in the drawing of the present invention is adapted for use with either a single-rotor type helicopter using a counter-torque propellor or for the forward rotor of a tandem rotor type helicopter.

The gear reduction in this device is achieved in two phases, the first resulting from the ratio of the main drive shaft pinion to the beveled ring gear carried by and which drives a sleeve mounted coaxial with the rotor drive shaft, and the second resulting from the use of an epicyclic gearing between this sleeve and the rotor shaft. The transmission housing accommodates and supports a stationary orbit gear and is combined with a unitary transmission support structure to which are attached upper and lower bells carrying the various bearings.

Reference should now be had to the drawings, and particularly to Fig. 1, for a general understanding of the invention. In that figure there is shown at 10 a portion of the principal forward pylon and fuselage bulkhead in the form of an elliptical ring fabricated of preformed sections of suitable light metal and adapted to have the fuselage skin attached directly to its outer flanged periphery. The plane of the main or lower portion of this bulkhead 10 is substantially vertical and transverse to the axis of the fuselage, but on the axis A—A near the top the bulkhead plane is canted so that the upper portion 12 is deflected rearwardly to fall in a plane at an angle of approximately 27° to the vertical to clear the rotor shaft and upper transmission housing bell. For practical reasons the sections 10 and 12 of the bulkhead are formed separately and their abutting ends are secured together by means of a pair of fittings 15 suitably formed of light weight metal forgings and properly channelled to receive the ends of the bulkhead frame parts which are attached thereto in any of the recognized manners. Each of these fittings has a relatively heavy center section which is drilled along the axis A—A to a large diameter to receive one of the mounting pins or tubes 16 for the transmission support-housing 18, as seen in Fig. 3.

This housing-support 18 is roughly diamond-shaped in plan, and is made from a suitable aluminum alloy forging having flat upper and lower surfaces 19 and 20, respectively, parallel to each other and determining the plane of the fitting. The fitting is reduced in weight by appropriate cut-away portions, as indicated by the cut-outs 21 and the channelled edges 22. The ends are squared off as at 23 and holes 24 are drilled therein along the major axis to cut-outs 21 as seen in Fig. 3. Each hole receives one of the tubes or pins 16 which is secured in position by a nut 25. The two oppositely disposed pins are on the principal axis of fitting 18 and on axis A—A of the bulkhead and their outer ends are received in the bores in the two bulkhead fittings 15. Each bore is considerably larger than the pin diameter and rubber or like resilient material 26 is vulcanized between the pin and the walls of the bore to provide resilience of mounting, which assists in absorbing the vibration of operation. These two fittings 15 and their pins provide the principal support for the housing-fitting, and it will be observed that this is a flexible mounting on a transverse horizontal axis. Rotation about this axis is restrained by a third mounting to be later described.

The central portion of the fitting 18 is circular and hollow, as seen at 28. The top and bottom walls are bored out to provide large circular openings. Beyond these openings the walls overhang the chamber 28 in the form of flanges 29, best seen in Fig. 2, and to these flanges are attached the flat circular flanges of the upper bell 30 and lower bell 31 of the transmission casing.

The lower bell 31 is saucer shaped and relatively shallow and has formed integral therewith the central annular bearing wall 32 counterbored to support the outer race of bearing 33. It also has a chamber therein at 34 to receive the body of oil pump 35 introduced and secured therein from beneath and having a stub shaft 36 mounting a pinion 37. The lower bell is formed with a skirt 39 closely fitting the bore in the fitting 18, and with a flange 40 underlying the flange 29 of the fitting 18, to which it is attached by a number of through bolts 41 and appropriate nuts also attaching other parts as will appear later.

The upper bell is much more complex and is almost truly bell-shaped, tapering, as seen, from the diameter of the central portion of the fitting 18 to a relatively small tubular portion 43, near the top. It contains intermediate webs 44 and 45 horizontally disposed and each appropriately bored and counterbored to receive the outer race of the respective oppositely facing tapered roller bearings 46 and 47. Near the top the upper neck is bored and counterbored as at 48 to receive the outer race of the combined thrust and radial ball bearing 49, which is positioned by a cap 50 suitably bolted to the upper flared end of the bell and carrying any appropriate grease retaining means (not shown).

Formed integral with the upper bell is the laterally disposed sleeve 52 whose axis inclines downwardly at the angle required to accommodate the power drive shaft. There is an extension of the cylindrical portion 43 of the upper bell across most of the inner end of the sleeve 52 as shown at 53 to reinforce and appropriately support the mounts for the two bearings 46 and 47 previously mentioned. The lower portion of the sleeve does not project into the bell much beyond its overlap with fitting 18 to provide clearance for the drive pinion.

The power shaft sleeve 52 is circular in cross-section and of an internal diameter greater than that of the drive pinion. Its outer end is formed with a radially outwardly disposed flange 53.

Against this flange is abutted the flange 54 of a unitary closure cap and bearing carrier secured thereto by means of a circle of bolts 55. This cap-carrier structure is generally tubular and has outer and inner cylindrical portions 56 closely engaging the walls of sleeve 52 for accurate positioning. Its inner end is counterbored to receive the outer race of roller bearing 57 while its outer end is counterbored to receive the outer race of roller bearing 58.

These two bearings support a stub pinion shaft 60 comprising a hollow forging of tubular form having formed integral with its inner end the beveled drive pinion 61 and having secured to its outer end the combined drive fitting and rotating cap 62. The outer face of this is equipped to receive the main tubular drive shaft in driving relation, as seen at 64. The inner races of bearings 57 and 58 are threaded on shaft 60, spaced by sleeve 59 and retained by nut 65. The whole assembly of shaft 60 bearings and cap-carrier is assembled before insertion in sleeve 52.

The shaft carrying the hub of the sustaining rotor is a thin walled tube 66 provided with a thickened and enlarged section 67 which is machined to receive the inner race of sustaining bearing 49 secured by means of threaded collar 68. Following the section 67 is the thinner straight tubular section 69 and then the thickened lower end portion 70 which is splined to receive the hub 71 of a planet carrier to be later described. Against the lower end of this hub is fitted the inner race of bearing 33 and the assembly is held together by screw collar 72.

It will be noted that the shaft of the rotor, which is subject to serious, transient and variously directed thrusts from buffeting and the like is adequately supported at maximum spaced points at the bottom of the lower bell and the top of the upper bell, thereby giving it widely spaced bearings and adequate support under all conditions of loading and operation.

Surrounding but clear of the reduced portion 69 of the rotor shaft is the transfer sleeve 75 having the sun pinion 76 formed integral at its lower end. Intermediate its ends the sleeve is provided with the radial flange 77 to which is attached the overlapping web of beveled ring gear 78, positioned thereby to mesh with the drive pinion 61 previously mentioned.

The sleeve 75 is supported by the spaced bearings 46, 47 previously mentioned, and for this purpose the inner race of bearing 46 abuts shoulder 80 above flange 77 while the upper bearing race abuts shoulder 81 on the sleeve and is positioned by means of threaded nut 82 on the upper end of the sleeve. It will be noted that the bearings for this sleeve are widely spaced but that the ring gear and sun pinion are both below the two sets of bearings.

The sun pinion 76 on the sleeve 75 is substantially in the plane of the upper flange 29 of the housing-fitting 18 and arranged to be supported by this fitting is the large orbit gear 85. This gear is an internal one and has relatively little radial thickness beyond the roots of the teeth except in the central portion where it is intermediately fitted with a thin radial web 86. This web is of such diameter that it rests on the flange 29 at the top of the fitting 18 while the lower back face of the gear itself fits in the bore 88 therein to prevent any radial movement. Likewise the upper portion of the back of the gear fits in the corresponding bore 89 in the bottom edge of the upper bell while the gear web 86 abuts the flange 90 on this upper bell. The fastening bolts 41, mentioned in connection with securing the lower bell in position, serve this same purpose for the upper bell. They likewise pass through the web 86 of the orbit gear and secure the whole assembly tightly together against any relative movement in any direction.

In connection with the rotor shaft portion 70 there was mentioned the hub 71 of the planet carrier. This planet carrier 92 is constructed from an integral forging to have a radial web 93 supporting a plurality of equally spaced, integral, hollow vertical pins 94 on each of which is mounted a pair of inner races 95 of a set of dual roller bearings. The integral outer race 96 of each of these bearings is the shell of a planet gear toothed at 97. Each planet gear meshes with both the orbit gear 85 and the sun gear 76.

The means for securing the races of the planet gear bearings to the pins 94 is illustrated in Fig. 2 where a mushroom member 99 has its stem telescoped in the hollow of the pin and secured in position by a central bolt 100. The head of member 99 overlaps and holds down an annular element 101 which rests on the top of all of the bearing inner races. The planet carrier is of such depth vertically as to have sector shaped cut-outs 102 to house the planet gears, leaving heavy intermediate portions 103 extending to the edge and vertically bored as at 104 for lightness.

The oil pump 35 shown secured in the lower bell has its driving pinion 36 in mesh with a small thickness but large diameter ring gear 105 which has a pressed fit on the lower end of the sleeve-like hub of the planet carrier, being stopped against a suitable flange 106 thereon. This insures a high speed drive for the oil pump which circulates lubricant from the housing through suitable oil cooler and piping, not shown, and delivers it in appropriate quantities to various points in the housing where it is the most effective in lubricating places subject to wear and heating during operation. In order that there be no accumulation of air under pressure in the housing, which might force lubricant out of the seals, a vent plug 107 is provided near the upper end of the upper bell.

It will be recalled that the principal support for the housing-fitting 18 and hence the whole transmission unit comprises the pins 16 extending from its principal axis and received in rubber mounts in connecting fittings 15 for the two parts of the bulkhead structure. It will be seen that these pins can resist movement in every direction except for a couple about this axis. This couple is taken care of by the third mounting pin 110 shown only in Fig. 1. This pin passes through holes in a pair of spaced ears 111 integral with the upper rear of upper bell 30, as seen in Fig. 2, and through the enlarged end of upper support rod 112 which fits between these ears and is correspondingly drilled for the pin 110. This support rod 112 extends rearwardly through a loose fitting aperture 114 in the bulkhead and is suitably attached to one or more of the rearward frames or bulkheads and the fuselage skin aft of the bulkhead 10. This bulkhead 10 is relieved of the stresses resulting from and couple acting about axis A—A.

It will now be appreciated that the aft cant given to the upper portion 12 of the bulkhead is for the purpose of providing clearance for the upper bell of the transmission housing and the rotor shaft extending above the same.

I claim:

1. A transmission assembly for driving the forward rotor of a tandem rotor helicopter comprising in combination, a hollow housing-support adapted for attachment to the fuselage, a top shell, an orbit gear having a flange, said flange being interposed between said housing-support and shell, fastening means securing said parts in overlapping relation, a bottom shell secured to said housing-support, a rotor shaft, upper and lower bearings for said shaft respectively in the top and bottom shells, planet gears carried by said shaft and meshing with said orbit gear, a sleeve coaxial with said shaft, bearings for said sleeve in the top shell, a driving gear on said sleeve and a sun gear on said sleeve meshing with said planet gears.

2. A transmission assembly for driving the forward rotor of a tandem rotor helicopter comprising in combination, a hollow housing-support adapted for attachment to the fuselage, a top shell, an orbit gear having a flange, said flange being interposed between said housing-support and shell, fastening means securing said parts in overlapping relation, a bottom shell secured to said housing-support, a rotor shaft, upper and lower bearings for said shaft respectively in the top and bottom shells, planet gears carried by said shaft and meshing with said orbit gear, a sleeve coaxial with said shaft, bearings for said sleeve in the top shell, a driving gear on said sleeve, a sun gear on said sleeve meshing with said planet gears, a lateral extension on said top shell, a drive shaft having a pinion meshing with said driving gear, and means journalling said drive shaft in said lateral extension.

3. The transmission claimed in claim 2 in which said last mentioned means includes a unitary bearing carrier and cap for said extension.

4. A transmission assembly for driving the substantially vertical forward rotor shaft of a tandem rotor helicopter from a downwardly inclined drive shaft comprising in combination, a diamond shaped hollow housing-support, mounting pins secured therein and extending outwardly along the major axis thereof, said housing-support having substantially flat upper and lower flanges, a bottom shell engaging the lower flange, a top shell cooperating with the upper flange, an orbit gear having a flange interposed between the upper flange and the top shell, means securing the above mentioned parts together, a rotor shaft extending through the top shell and the housing-support and into the lower shell, upper and lower bearings for the shaft respectively at the top of the top shell and at the bottom of the bottom shell, a sleeve loosely surrounding said shaft, a sun gear on said sleeve in the plane of said orbit gear, a bevel drive gear for said sleeve above said sun gear, a pair of spaced bearings interposed between the top shell and the sleeve above said drive gear, a plurality of planet pinions between the sun and orbit gears, a planet carrier mounting said planet pinions and secured to said shaft, a lateral tubular extension on said top shell, a drive shaft stub journalled in said extension and a pinion on said stub meshing with said drive gear.

5. The transmission assembly as defined in claim 4 in which a lubricating pump is mounted in said bottom shell with its shaft vertical, a pinion on said pump shaft and a gear on the rotor shaft meshing with said pump pinion.

6. A housing and mounting for the transmission for driving a helicopter rotor comprising in combination, a substantially flat, diamond shaped forging having a central chamber therein defined by a circular wall and overhanging top and bottom flanges, a pair of oppositely disposed mounting pins secured in said forging and extending outwardly therefrom along the major axis thereof, top and bottom shells cooperatively attached to said forging flanges to define a closed chamber for transmission elements, a third mounting pin parallel to the first mentioned pins and means near the top of the top shell supporting the third pin.

7. The housing and mounting as defined in claim 6, in which a rotatable power shaft is introduced into said chamber at an elevation intermediate the level of the first mentioned pins and that of the third pin and lying in a plane extending normal to said pins.

8. A drive system for a rotor vertical shaft for a helicopter comprising in combination, a rotor shaft, a sleeve coaxial with and loosely surrounding a portion of said shaft but free of bearing relationship therewith, a power shaft, a pinion on said power shaft, a ring gear on said sleeve below and meshing with said pinion, a sun gear on said sleeve directly below said ring gear, an orbit gear, a plurality of planet gears connecting the sun and orbit gears, a planet carrier on said shaft, means on said carrier journalling said planet gears, and a housing independently journalling said shafts and said sleeve each at two spaced bearings and immobilizing said orbit gear.

9. The drive system as defined in claim 8 in which said sleeve is journalled only at spaced stations above the said ring gear and the rotor shaft is journalled only at stations spaced above the sleeve and below the planet carrier.

10. A drive system for a vertical shaft comprising in combination, a vertical tubular shaft, a driving sleeve coaxial with and surrounding but independent of and free of bearing contact with the shaft, means to rotate said sleeve, a sun gear on the lower end of said sleeve, a housing providing separate bearings for the shaft and sleeve, an orbit gear fixed to said housing in the plane of said sun gear, planet gears meshing with the sun and orbit gears, a carrier for said planet gears secured to said shaft and including a spider, an integral hollow vertical pin on said spider for each planet gear, inner roller bearing races on each pin, each planet gear being formed with integral outer bearing races, a ring resting on the top of all pins to hold the inner races thereon, a mushroom-headed stud passing through the ring and closely engaging the bore of each pin and means fastening said studs in said carrier.

11. A transmission assembly for driving the substantially vertical rotor shaft of a helicopter from a drive shaft comprising in combination, a diamond shaped hollow housing-support, mounting pins secured therein and extending outwardly along the major axis thereof, said housing-support having substantially flat upper and lower flanges, a shallow bottom shell engaging the lower flange, a deep top shell cooperating with the upper flange, an orbit gear mounted in the housing-support, means securing the above mentioned parts together, a rotor shaft extending through the top shell and the housing-support and into the lower shell, upper and lower bearings for the shaft respectively at the top of the top shell and at the bottom of the bottom shell, a sleeve loosely surrounding said shaft, a sun gear on said sleeve in the plane of said orbit gear, a drive gear on said sleeve above said sun gear, a pair of spaced bearings interposed between the top shell and the sleeve above said drive gear, a plurality of planet pinions between the sun and orbit gears, a planet carrier mounting said planet pinions and secured to said shaft, a drive stub journalled in said upper shell and a pinion on said stub meshing with said drive gear.

CHARLES C. MILLER, Jr.

REFERENCES CITED

The following references are of record in the file of this patent:

UNITED STATES PATENTS

| Number | Name | Date |
|---|---|---|
| 1,539,075 | Chilton | May 26, 1925 |
| 1,546,967 | Buehler | July 21, 1925 |
| 2,002,405 | Lausing | May 21, 1935 |
| 2,093,325 | Lausing | Sept. 14, 1937 |
| 2,147,285 | Double et al. | Feb. 14, 1939 |
| 2,148,313 | Williams | Feb. 21, 1939 |
| 2,271,640 | Heintz | Feb. 3, 1942 |